United States Patent
Bono et al.

[11] Patent Number: 5,853,781
[45] Date of Patent: Dec. 29, 1998

[54] CONTAINER FOR HEATING FRENCH FRIES IN A TOASTER

[75] Inventors: James L. Bono, Cincinnati; Lewis A. Tucker, Fairfield; Deborah J. Yee, Cincinnati, all of Ohio

[73] Assignee: The Procter & Gamble Company, Cincinnati, Ohio

[21] Appl. No.: 668,488

[22] Filed: Jun. 21, 1996

[51] Int. Cl.$^6$ ............ A21D 10/02; A23L 1/216; A47J 37/08; B29D 22/00

[52] U.S. Cl. ............ 426/110; 426/637; 99/385; 99/391; 99/400; 99/402; 99/450; 220/491; 428/34.1

[58] Field of Search ............ 428/34.1; 99/385, 99/391, 400, 402, 450; 426/82, 83, 110, 637; 220/491

[56] References Cited

U.S. PATENT DOCUMENTS

| | | | |
|---|---|---|---|
| 2,838,404 | 6/1958 | Cohen | 99/174 |
| 2,881,078 | 4/1959 | Oritt | 99/171 |
| 2,912,336 | 11/1959 | Perino | 99/174 |
| 2,962,957 | 12/1960 | Bork | 99/402 |
| 3,117,875 | 1/1964 | Burns et al. | 99/174 |
| 3,185,372 | 5/1965 | Ferraro | 229/3.5 |
| 3,361,576 | 1/1968 | Jacobson | 99/171 |
| 3,392,033 | 7/1968 | Thulin | 99/171 |
| 3,410,700 | 11/1968 | Gstohl | 99/192 |
| 3,424,596 | 1/1969 | Sullivan | 99/174 |
| 3,442,662 | 5/1969 | Robinson | 99/171 |
| 3,446,632 | 5/1969 | Le Van | 99/174 |
| 3,469,998 | 9/1969 | Lane | 99/171 |
| 3,554,770 | 1/1971 | Lipsky et al. | 99/174 |
| 3,585,048 | 6/1971 | Uhlig et al. | 99/174 |
| 3,597,238 | 8/1971 | Scharre | 99/174 |
| 3,615,706 | 10/1971 | Robinson | 99/171 H |
| 3,615,711 | 10/1971 | Markus et al. | 99/171 H |
| 3,633,239 | 1/1972 | Rowe et al. | 99/171 |
| 3,672,916 | 6/1972 | Virnig | 99/171 H |
| 3,728,957 | 4/1973 | Polus | 99/433 |
| 3,741,778 | 6/1973 | Rowe | 99/171 H |
| 3,759,721 | 9/1973 | Hawley | 99/171 H |
| 3,831,508 | 8/1974 | Wallard | 99/440 |
| 3,836,064 | 9/1974 | Stillwagon | 229/3.5 MF |
| 3,873,735 | 3/1975 | Chalin et al. | 426/87 |
| 3,891,775 | 6/1975 | Murray et al. | 426/107 |
| 4,007,292 | 2/1977 | Shatila et al. | 426/637 |
| 4,051,266 | 9/1977 | Goltsos | 426/120 |

(List continued on next page.)

FOREIGN PATENT DOCUMENTS

| | | | |
|---|---|---|---|
| 797651 | 10/1968 | Canada | 220/43.5 |
| 797652 | 10/1968 | Canada | 220/43.5 |
| 869865 | 5/1971 | Canada | 217/38 |
| 1158988 | 7/1969 | United Kingdom | B65D 81/34 |
| WO 96/09967 | 4/1996 | WIPO | B65D 17/00 |

*Primary Examiner*—James C. Housel
*Assistant Examiner*—Phuong T. Bui
*Attorney, Agent, or Firm*—Rodney M. Young; Jack L. Oney, Jr.; Ronald W. Kock

[57] ABSTRACT

A container supporting French fries to be heated in a toaster. The toaster has an article receiving slot. The container comprises an upright structure having a closed bottom and a front and a back parallel to the front which are held together along adjacent side edges by mechanical means. The upright structure has an openable top for access to heated French fries. The front and back have apertures located above the closed bottom. The apertures provide an open area in the front and the back to pass toaster radiation heat into the container to heat the food article and for steam from heated French fries to exit the container. The upright structure has a portion extending sufficiently above the toaster which is cool-to-the-touch and electrically non-conductive to enable a user to lift the container from the toaster without a finger burn or electrical shock. The closed bottom of the container forms a drip trough. The container also has a fluid-absorbing member at the drip trough to absorb drippings from the heated French fries.

21 Claims, 2 Drawing Sheets

U.S. PATENT DOCUMENTS

| | | | |
|---|---|---|---|
| 4,129,067 | 12/1978 | Reiland | 99/391 |
| 4,135,004 | 1/1979 | Finkel | 426/550 |
| 4,238,517 | 12/1980 | Bosley, Jr. et al. | 426/250 |
| 4,290,349 | 9/1981 | Florenza | 99/388 |
| 4,522,953 | 6/1985 | Barby et al. | 521/64 |
| 4,603,052 | 7/1986 | El-Hag et al. | 426/523 |
| 4,656,927 | 4/1987 | Mosby et al. | 99/388 |
| 5,034,234 | 7/1991 | Andreas et al. | 426/107 |
| 5,073,390 | 12/1991 | Knight, III et al. | 426/113 |
| 5,096,723 | 3/1992 | Turpin | 426/107 |
| 5,175,404 | 12/1992 | Andreas et al. | 219/10.55 |
| 5,260,345 | 11/1993 | Desmarais et al. | 521/148 |

CONTAINER FOR HEATING FRENCH FRIES IN A TOASTER

FIELD OF THE INVENTION

The present invention relates to containers for supporting food articles heated in a toaster.

BACKGROUND OF THE INVENTION

A conventional toaster, with multiple upright slots and banks of upright radiant heaters located at either side of each toaster slot, provides rapid heating of food articles. Although initially intended for toasting bread, toasters are now used to heat waffles and other food articles.

The art also teaches the placement of disposable foil packages containing food articles into toaster slots. Such packages may have perforations to enable radiant heat to enter and steam to exit. However, packages in the art are deficient in terms of their ability to absorb drippings from food articles which contain oils or other fluids which do not readily vaporize upon heating in a toaster.

When handling toaster containers for food articles, the user may be involved in loading the articles into the container, removing the heated container from the toaster, and removing the articles from the heated container. If the container is designed to be disposable, the user typically isn't concerned with stacking articles into the container. However, in either a disposable container or a reusable container situation, the user is faced with manipulating a heated container. There is also a concern for avoiding electrical shock from a faulty toaster if the container is electrically conductive. Although the art suggests complicated handle mechanisms, what is missing is a simple means for manipulating the container which is either integral to the container material or which serves merely as a lifting tab.

Prior art U.S. Pat No. 3,410,700 to Gstohl discloses a perforated aluminum foil package for heating frozen pizza in a toaster. The vertical foil edges of Gstohl's package are sealed closed by means of pressure sensitive adhesive. Although such adhesives may be available which are compatible with 600° F. toaster temperatures, most adhesives are not. In order for the package to be toaster compatible, to have no opportunity for food contamination, and to be low in cost, Applicants believe that no adhesives should be used at the edge seams.

OBJECTS OF THE INVENTION

It is an object of the present invention to provide a container, for heating in a toaster a food article, which has an absorbent member for absorbing drippings from the food article as it is heated.

It is another object of the present invention to provide a means for handling a container supporting a food article which has been heated in a toaster such that the means for handling is always cool-to-the-touch and prevents electrical shock from a faulty toaster.

It is a further object of the present invention to provide a container for use in a toaster which has no adhesive in the vertical side edges which could melt or otherwise contaminate food articles contained in the container.

SUMMARY OF THE INVENTION

In one aspect of the present invention, a container for supporting a food article to be heated in a toaster, having an article receiving slot, comprises an upright structure having a closed bottom and a front and a back substantially parallel to the front. The front and the back are held together along adjacent edges by a means other than adhesive. The upright structure has an openable top for access to a heated food article therein. The front and the back have apertures providing an open area in the front and the back to pass toaster radiation heat into the container to heat the food article and for steam from the heated food article to exit the container. The closed bottom of the container forms a drip trough. The upright structure also has a portion extending sufficiently above the toaster to enable a user to lift the container from the toaster by gripping the portion without having to place fingers in the article receiving slot of the toaster. Preferably, the portion extending above the toaster is both cool-to-the-touch and electrically non-conductive, such as a paper lifting tab.

The container further comprises a fluid-absorbing member at the drip trough to absorb drippings from the food article when the food article is heated. The fluid-absorbing member may comprise a hydrophilic and lipophilic material made of fibers, foams, gels, and combinations thereof; and it may be fixedly attached to the drip trough or removable for replacement therein.

The means for holding the front and the back together along the adjacent edges may be a mechanical bond selected from the group consisting of folding, crimping, perforating, spot welding, and combinations thereof The upright structure may be substantially rigid in order to be reusable in the toaster, such that a food article is manually loadable into the openable end after the heated food article is removed therefrom, and the container is reinsertable into the toaster. Alternatively, the upright structure may comprise a thin metal foil which serves as a disposable package for storage of the food article as well as for support for the food article in the toaster.

The openable end is preferably closable so that the package may be closed for storage and opened for removal of the heated food article.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
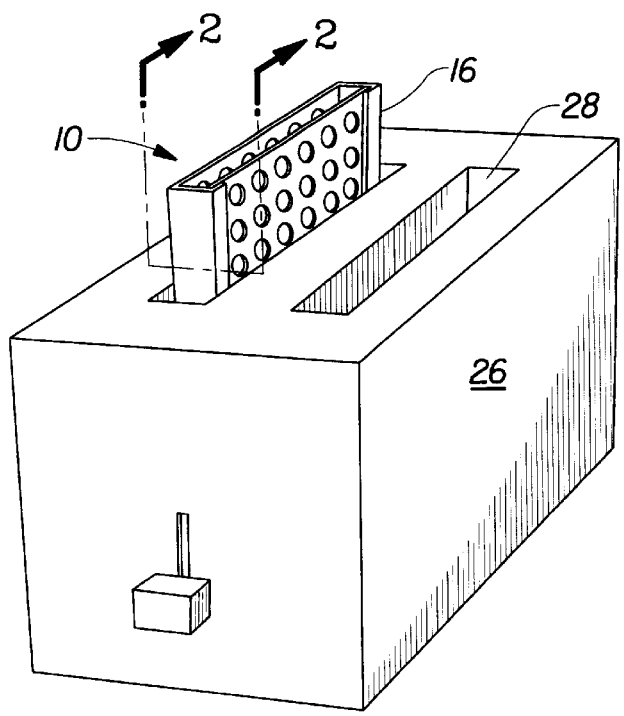
FIG. 1 is perspective view of a toaster and a preferred embodiment of the present invention, showing a container for heating food articles with its top portion extending from the toaster slot.
Figure 2:
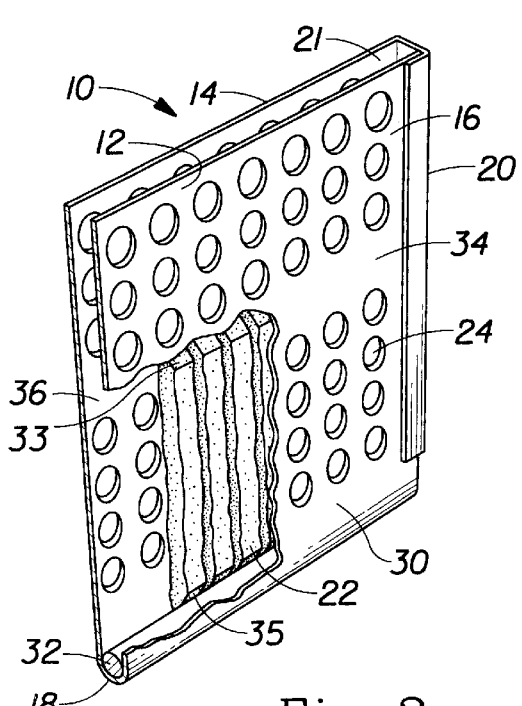
FIG. 2 is a sectioned perspective view of the container of FIG. 1, taken along section line 2—2 of FIG. 1, showing apertures in both front and back of an upright container structure having folded side edges, an open top, a closed bottom, a fluid-absorbing member at the closed bottom, and food articles resting atop the fluid-absorbing member.

Referring now to the drawings, and more particularly to FIGS. 1 and 2, there is shown a first preferred embodiment of the present invention, which provides a container for heating a food article in a toaster, and is generally indicated as 10. Container 10 has an upright structure comprising a front 12, a back 14, a top portion 16, a closed bottom 18, and side edges 20. Top portion 16 has an openable top end 21, which may be closable or always open. Container 10 is designed to hold a food article 22 or a plurality of food articles, such as a stack of frozen French fries one layer deep, between front 12 and back 14.

Front 12 and back 14 both have apertures 24 therethrough for the purpose of allowing radiant heat from a conventional toaster 26 into container 10 to heat food articles 22. Conventional toaster 26 typically has one or more upright slots 28 into which are placed items to be heated. At either side of each slot is a heating element (not shown) which may be heated to about 600° F. At this temperature, infrared radiation is directed from the heating elements toward the item resting in each slot. The heating elements do not contact the items in the slots; therefore, radiation is believed to be the primary means of heat transfer. Heating continues for several minutes or until a sensor detects the desired temperature or discoloration of the heated item. The user generally is required to lift the heated item out of the toaster slot after the heat cycle is completed.

Apertures 24 preferably have an open area which enables heat to enter at a rate which properly heats the food article. Different food article sizes, shapes, and moisture content, for example, may require different aperture open areas to regulate heating rate. For French fries of the type disclosed in copending application, Ser. No. 08/639,820, entitled "PROCESS FOR PREPARING FROZEN PAR-FRIED POTATO STRIPS HAVING DEEP FRIED TEXTURE WHEN OVEN FINISHED", filed on Apr. 29, 1996, which is hereby incorporated by reference, the preferred open area ranges from 50% to 75%. Apertures 24 also enable steam generated during the heating of food articles 22 to escape from the food articles to outside of container 10. Apertures 24 are preferably round and 9.5 mm in diameter and are placed in a nested or non-nested pattern. Any pattern or shape of apertures may be used to provide the desired open area. However, it is preferable that aperture size be limited to a size smaller than that which will allow food articles to escape from the container through such apertures.

Container 10 may be made substantially rigid from metal as a reusable holder for a plurality of food articles, or it may be made from thin flexible metal foil such that it is disposable. If reusable, top portion 16 preferably has a permanently open end 21 for loading and unloading food articles. If disposable, top portion 16 may have either a permanently open end 21 or a closable end which is openable or partially openable for venting while maintaining food article containment. For example, top portion 16 could be foldable downward against front 12 and even sealed thereto for storage of food article 22.

Top portion 16 preferably extends well above the vertical slot of a conventional toaster so that the extended top portion is cool-to-the-touch during and after heating in the toaster. The apertures in thin metal foil provide limited conduction paths for heat to flow between apertures and significant convection paths for air to cool the foil. Having a cool-to-the-touch portion enables the user to safely lift the heated package and contents out of the toaster by his or her fingers. Utilizing the apertured top portion of the container for cool-to-the-touch handling eliminates the need for add-on handles or other more expensive solutions. For cool-to-the-touch effectiveness, the top portion preferably extends 25–50 mm above the toaster slot when the container is fully inserted into the slot.

Figure 6:
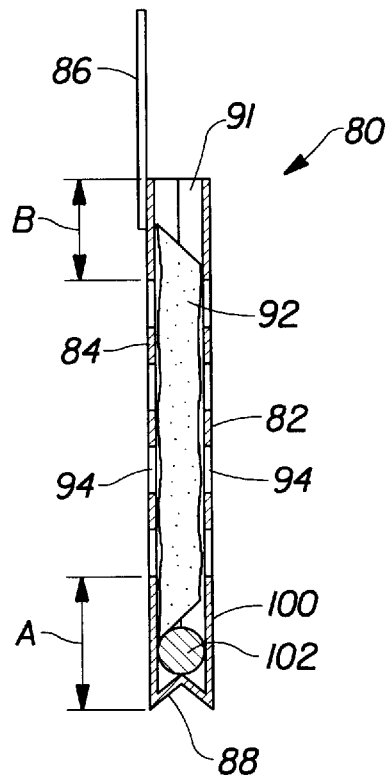
FIG. 6 is a sectioned side elevation view thereof, taken along section line 6—6 of FIG. 5, showing non-apertured portions C and D located at the uppermost ends and lowermost ends of a stack of food articles, such as French fries, and a non-electrically conductive lifting tab attached to the container.
Figure 5:
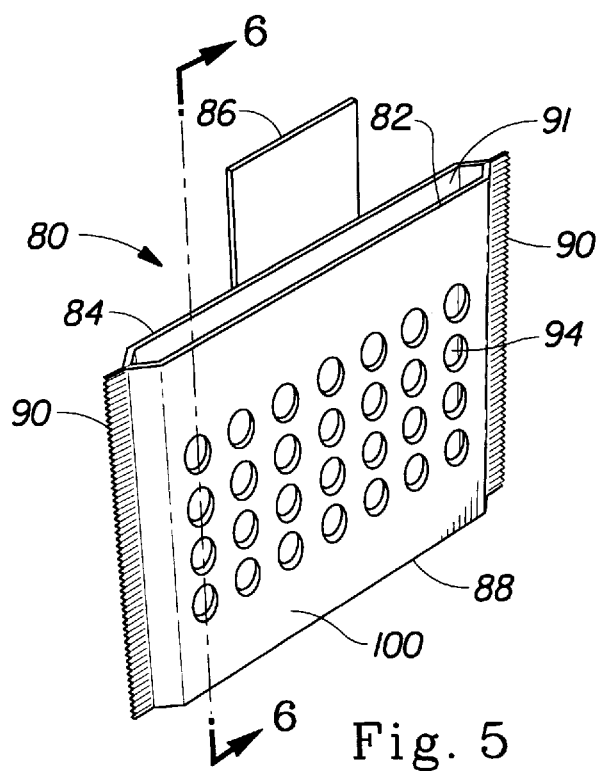
FIG. 5 is a perspective view of another alternative embodiment of the present invention, showing the container for heating a food article.

A defective toaster may enable a current to pass through container 10 from toaster 26 and thereby potentially cause an electrical shock. Although such occurrence could be expected to be extremely rare based on known toaster safety records, top portion 16, and indeed entire container 10, may be coated externally with an electrically non-conductive material, such as silicon dioxide. Alternatively, as shown in FIGS. 5 and 6, an electrically non-conductive paper lifting tab may be attached to the container in place of top portion 16 in order to reduce container material as well as to reduce the potential for electrical shock.

Figure 3:
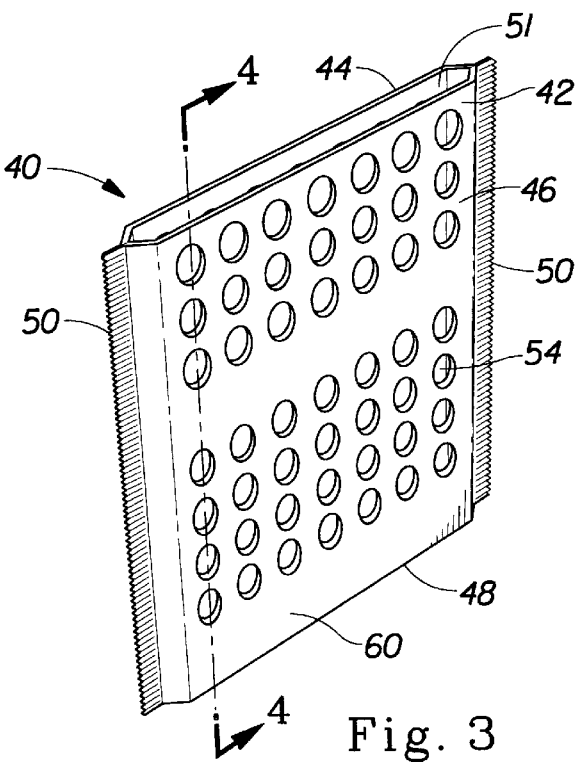
FIG. 3 is a perspective view of an alternative embodiment of the present invention, showing the container for heating a food article, which has crimped side edges.

Side edges 20 of container 10 have no adhesive holding them together because adhesive may melt or otherwise contaminate food articles inside the container during heating. Instead, side edges 20 of front 12 and back 14 are held together for example, by folding the front or the back side edges into a lap joint or by folding abutted edges 180° together in one direction, or by other commonly known folding techniques. Once folded, the foil holds its folded condition and thereby maintains the side edges closed. Alternatively, for thin metal foil, a preferred means of joining side edges is to crimp abutted side edges as shown in FIG. 3. Still other mechanical fastening techniques may be used, such as perforating abutted side edges, spot welding them together, or combinations of these techniques. It is preferred that the mechanical fastening technique have adequate strength to withstand handling and heating but be weak enough that side edges are openable to ease the removal of heated food articles from the container after heating is completed. Preferably, the thin metal foil is aluminum foil 1 mils to 4 mils thick.

Closed bottom 18 of container 10 is preferably folded so that container 10 may be made of a single sheet of material; however, closed bottom 18 may be joined similarly to side edges if front and back are two different sheets of material. The fold depends on the type of side edge seam used. For example, in FIG. 2, a rounded bottom or single crease fold is used when side edges are folded in an overlap fashion. However, in FIG. 3, multiple bottom folds may be used when side edges are abutted and then joined. The closed bottom is designed to accommodate the thickness of the single layer of food articles placed in the container.

For food articles such as French fries, which contain fluids in addition to water, such as oil, heating causes fluids to drip from the food articles. Closed bottom 18 preferably forms a drip trough 30 into which the drippings may accumulate. Located in drip trough 30 of closed bottom 18 is preferably a fluid-absorbent member 32, which is made of a material which will absorb drippings while supporting food articles 22 so that drippings are effectively separated from the food articles. Fluid-absorbent member 32 may be fixedly attached into drip trough 30 or it may be removable therefrom so that a replacement member 32 may be used in a reusable container. In the disposable container, fluid-absorbing member 32 is preferably fixedly attached by mechanically crimping drip trough 30 part way around member 32 or by adhesively bonding member 32 to the bottom of drip trough 30. Adhesive used below the level of the toaster heating elements remains relatively cool during food article heating.

When French fries are heated in a toaster, the uppermost ends 33 and lowermost ends 35 of the French fries may be burned because they are typically tapered and therefore have less mass at their ends, which heats faster than the bodies of the French fries. To avoid burning, the ends of the French fries are preferably protected from exposure to direct radiation from toaster heating elements. This protection is accomplished by providing front 12 and back 14 with non-apertured zones at the elevation of the tapered ends of the French fries. At the uppermost ends 33 of French fries 22, a solid band of material 34 in front 12 and a solid band of material 36 in back 14 serve to shield direct radiation from the heating elements. At lowermost ends 35 of French fries 22, drip trough 32 is provided a depth without apertures, which similarly shields lowermost ends 35 from the direct radiation of the heating elements. Preferably, apertures are located a distance A from the bottom edge of the container and the solid band has a width B, as shown in FIG. 4.

Figure 4:
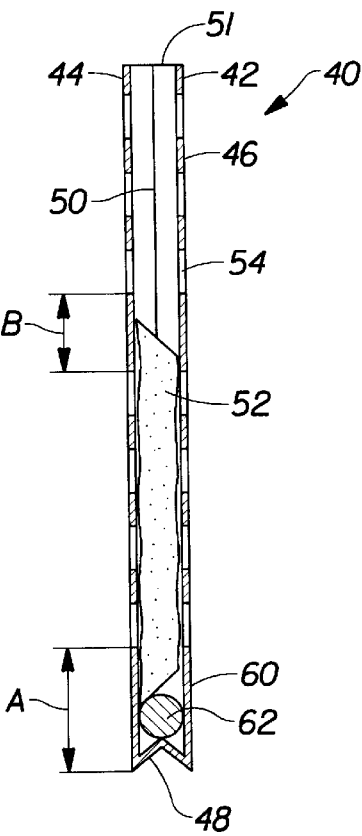
FIG. 4 is a sectioned side elevation view thereof, taken along section line 4—4 of FIG. 3, showing multiple folds at the closed bottom, which accommodates crimped side edges and food article thickness.

FIGS. 3 and 4 show another embodiment of the container for heating food articles in a toaster, which is essentially the same as the embodiment of FIGS. 1 and 2, except that the side edges are shown crimped closed instead of folded. A container generally indicated as 40 has an upright structure comprising a front 42, a back 44, a top portion 46, a closed bottom 48, and side edges 50. Top portion 46 has an openable top end 51, which may be closable or always open. Container 40 is designed to hold a food article 52 between front 42 and back 44.

Front 42 and back 44 both have apertures 54 therethrough for the purpose of allowing radiant heat from a conventional toaster into container 40 to heat food article 52. Apertures 54 preferably have an open area which enables heat to enter at a rate which properly heats the food article. Apertures 54 are preferably round and 9.5 mm in diameter and are placed in horizontal rows. Any pattern or shape of apertures may be used to provide the desired open area.

Since container 40 is preferably made of thin flexible foil, top portion 46 may have either a permanently open end 51 or a closable end which is openable. For example, top portion 46 could be foldable downward against front 42 and even sealed thereto for storage of food article 52. Top portion 46 preferably extends well above the vertical slot of a conventional toaster so that the extended portion is cool-to-the-touch during and after heating in the toaster.

Closed bottom 48 of container 40 is preferably folded so that container 40 may be made of a single sheet of material and yet accommodate the thickness of the food article placed in the container. Closed bottom 48 preferably forms a drip trough 60 into which the drippings may accumulate. Located in drip trough 60 of closed bottom 48 is preferably a fluid-absorbent member 62, which is made of a material which will absorb drippings while supporting food article 52 so that drippings are effectively separated from the food article.

FIGS. 5 and 6 show another alternative embodiment of the container for heating a food article in a toaster, which is essentially the same as the embodiment of FIGS. 3 and 4, except that the top portion, which extends above the toaster, is replaced by a non-electrically conductive lifting tab. A container generally indicated as 80 has an upright structure comprising a front 82, a back 84, a lifting tab 86, a closed bottom 88, and side edges 90. Opposite closed bottom 88 is an openable top end 91, which may be closable or always open. Container 80 is designed to hold a food article 92 between front 82 and back 84.

Front 82 and back 84 both have apertures 94 therethrough for the purpose of allowing radiant heat from a conventional toaster into container 80 to heat food article 92. Apertures 94 preferably have an open area which enables heat to enter at a rate which properly heats the food article, but with small enough apertures that a plurality of food articles, like a stack of French fries, cannot fall out. Apertures 94 are preferably round and 9.5 mm in diameter and are placed in a nested pattern. Any pattern or shape of apertures may be used to provide the desired open area.

Since container 80 is preferably made of thin metal foil, openable top end 91 may either be permanently open or closable and openable. Openable top end 91 is located within toaster slot 28 when heating occurs. Electrically non-conducting lifting tab 86 is preferably made of paper and is connected to container 80 by staple, crimp, or other attachment means. Lifting tab 86 preferably extends well above the vertical slot of a conventional toaster so that it is cool-to-the-touch during and after heating in the toaster.

Closed bottom 88 of container 80 is preferably folded so that container 80 may be made of a single sheet of material and yet accommodate the thickness of the food article or articles placed in the container. Closed bottom 88 preferably forms a drip trough 100 into which the drippings may accumulate. Located in drip trough 100 of closed bottom 88 is preferably a fluid-absorbent member 102, which is made of a material which will absorb drippings while supporting food article 92 so that drippings are effectively separated from the food article.

In a particularly preferred embodiment of the present invention, food article 22, 52, and 92 is a stack of upright French fries, which have an average length of 76 mm to 102 mm, an average thickness of 6 mm and an average width of 6 mm. Although the aperture size of 9.5 mm diameter is large enough for a 6 mm by 6 mm cross-section French fry to pass through, the ability to angle a French fry relative to the plane of an aperture within the container is limited; thus, this aperture size and shape effectively prevents French fries falling out of the container, as determined empirically. Typically, a container 40 will hold 18 French fries stacked upright, side-by-side in a single layer. Container 40 has outer dimensions of 152 mm height, 124 mm width, and 7 mm thickness. Dimensions A and B or C and D are preferably 12 mm and 12 mm, respectively. Aperture open area in the front and back of the container between solid band of material and the non-apertured drip trough preferably ranges from about 50% to about 75%.

Fluid-absorbing member 62 is preferably a hydrophilic and/or lipophilic absorbing material, depending on the drippings to be absorbed, having dimensions of 6 mm by 110 mm. Fluid absorbing member 62 for use with French fries, for example is preferably made of open-celled polymeric foam of the type described in U.S. Pat. No. 5,260,345 to DesMarais et al., entitled "ABSORBENT FOAM MATERIALS FOR AQUEOUS BODY FLUIDS AND ABSORBENT ARTICLES CONTAINING SUCH MATERIALS", which issued on Nov. 9, 1993, and which is hereby incorporated by reference.

The time for toasting frozen French fries typically ranges from about 1.5 minutes to about 2.5 minutes. Overheating container 40 is not a problem, since it is preferably made of metal that melts at nearly double the temperature of a conventional toaster heating temperature. It is believed that fluid-absorbing member 62 experiences much less of that heat because it is located near the bottom of the toaster.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A toasted French fries product for providing a plurality of toasted French fries comprising:

a plurality of French fries, said French fries being aligned vertically substantially adjacent to each other in one layer, said French fries having a bottom end and a top end; and a container for supporting said French fries to be heated in a toaster, said container having an article receiving slot, said container comprising an upright structure having a closed bottom and a front and a back substantially parallel to said front, said front and said back being held together along adjacent edges by a means other than adhesive, said upright structure having an openable top for access to heated French fries therein, said front and said back having apertures providing an open area in said front and said back to pass toaster radiation heat into said container to heat said French fries and for steam from said heated French fries to exit said container, said front and said back having non-apertured zones at the elevation of said bottom end and said top end of said French fries, said closed bottom of said container forming a drip trough, said upright structure also having a portion extending sufficiently above said toaster to enable a user to lift said container from said toaster by gripping said portion without having to place fingers in said article receiving slot of said toaster.

2. The container of claim 1 wherein said portion is both cool-to-the-touch and electrically non-conductive.

3. The container of claim 2 wherein said portion comprises a paper lifting tab.

4. The container of claim 1 further comprising a fluid-absorbing member at said drip trough to absorb drippings from said french fries when said French fries are heated.

5. The container of claim 4 wherein said fluid-absorbing member comprises a material selected from the group consisting of fibers, foams, gels, and combinations thereof.

6. The container of claim 4 wherein said fluid-absorbing member is fixedly attached to said drip trough.

7. The container of claim 4 wherein said fluid-absorbing member is removable from said upright structure and replaceable with a fresh fluid-absorbing member.

8. The container of claim 1 wherein said means for holding said front and said back together along said adjacent edges is a mechanical bond selected from the group consisting of folding, crimping, perforating, spot welding, and combinations thereof.

9. The container of claim 1 wherein said upright structure is substantially rigid in order to be reusable in said toaster, such that said French fries are manually loadable into said openable end after said heated French fries are removed therefrom, and said container is reinsertable into said toaster.

10. The container of claim 1 wherein said upright structure comprises a thin metal foil which serves as a disposable package for storage of said French fries as well as for support for said French fries in said toaster.

11. A toasted French fries product for providing a plurality of toasted French fries comprising:

a plurality of French fries, said French fries being aligned substantially adjacent to each other in one layer, said French fries having a bottom end and a top end;

a container for supporting said French fries to be heated in a toaster, said container having an article receiving slot, said container comprising an upright structure having a closed bottom and a front and a back substantially parallel to said front, said front and said back being held together along adjacent edges by a means other than adhesive, said upright structure having an openable top for access to heated French fries therein, said front and said back having apertures providing an open area in said front and said back to pass toaster radiation heat into said container to heat said French fries and for steam from said heated French fries to exit said container, said front and said back having non-apertured zones at the elevation of said bottom end and said top end of said French fries, said closed bottom of said container forming a drip trough, said upright structure also having a portion extending sufficiently above said toaster to enable a user to lift said container from said toaster by gripping said portion without having to place fingers in said article receiving slot of said toaster; and a fluid-absorbing member at said drip trough to absorb drippings from said heated French fries.

12. The container of claim 11 wherein said upright structure further comprises a portion extending sufficiently above said toaster to enable a user to lift said container from said toaster by gripping said portion without having to place fingers in said article receiving slot of said toaster.

13. The container of claim 12 wherein said portion is both cool-to-the-touch and electrically non-conductive.

14. The container of claim 13 wherein said portion comprises a paper lifting tab.

15. The container of claim 11 wherein said fluid-absorbing member comprises a material selected from the group consisting of fibers, foams, gels, and combinations thereof.

16. The container of claim 11 wherein said fluid-absorbing member is fixedly attached to said drip trough.

17. The container of claim 11 wherein said fluid-absorbing member is removable from said upright structure and replaceable with a fresh fluid-absorbing member.

18. The container of claim 11 wherein said upright structure is substantially rigid in order to be reusable in said toaster, such that said French fries are manually loadable into said openable end after said heated French fries are removed therefrom, and said container is reinsertable into said toaster.

19. The container of claim 11 wherein said upright structure comprises a thin metal foil which serves as a disposable package for storage of said French fries, said disposable package also supporting said French fries in said toaster.

20. The container of claim 11 wherein said openable end is closable so that said package may be closed for storage and opened for removal of heated French fries.

21. The container of claim 11 wherein said openable end is always open.

* * * * *